UNITED STATES PATENT OFFICE.

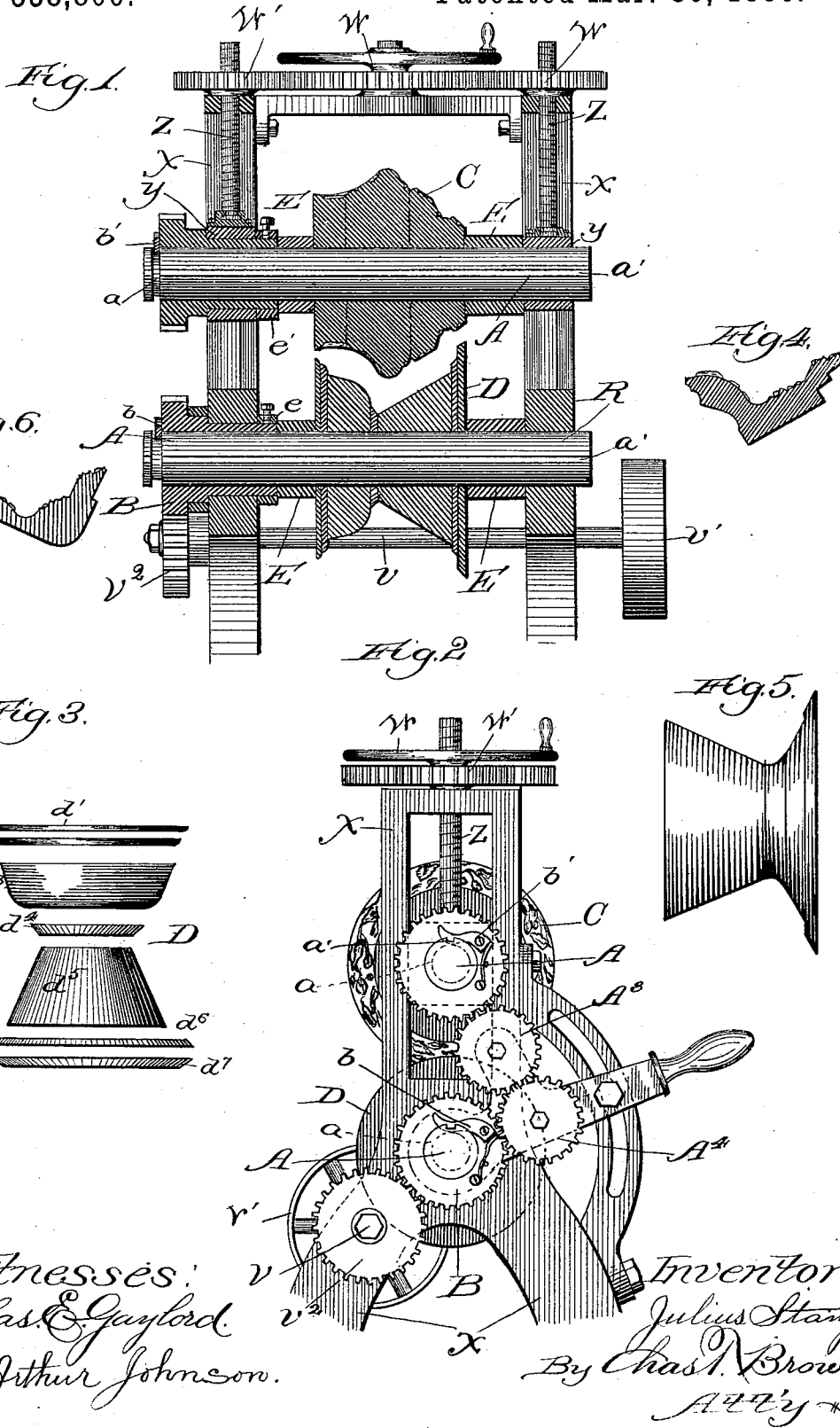

JULIUS STANGE, OF CHICAGO, ILLINOIS.

MACHINE FOR EMBOSSING PICTURE-FRAME MOLDING.

SPECIFICATION forming part of Letters Patent No. 338,800, dated March 30, 1886.

Application filed November 25, 1885. Serial No. 183,923. (No model.)

*To all whom it may concern:*

Be it known that I, JULIUS STANGE, a citizen of the United States, residing at Chicago, in the county of Cook and State of Illinois, have invented certain new and useful Improvements in a Machine for Embossing Picture-Frames and other Articles, of which the following is specification.

The object of my invention is to enable a picture-frame strip or molding in which the cross-section is other than a right line parallel or substantially parallel with the back of the strip to be embossed, and also to enable one to emboss a picture-frame strip or molding with a certain figure having raised and depressed figures arranged on a flat or curved surface, as desired, and, further, to place such embossing on different-shaped strips or molding so that without change in the embossing-wheel used a different effect may be produced in the embossed molding obtained therefrom, and in all the different forms of moldings or picture-frame strips named to properly support said strip on the back thereof, so that the said strip will not be broken or split by reason of the force or pressure necessarily employed in embossing the same; and a further, and one of the main objects of my invention, is to secure a machine in which the different objects herein named may be attained without change in the machine other than by the different adjustments hereinafter named.

In addition to the objects above set out, I desire to secure a machine upon which the ordinary picture-frame-strip embossing now in common use may be readily done when desired.

I am aware that machines for the purpose of embossing picture-frame moldings or strips are in common use; but, so far as I am aware, in all machines heretofore made for such purpose no molding can be embossed where the completed and embossed surface is other than substantially parallel with the back of the molding, and in order to obtain a molding in which the embossed surface shall be at an angle with the back of the molding it is necessary to build up the molding from several pieces, each piece having been previously separately embossed, as described.

Embossing as herein used consists of pressing upon a suitably-prepared strip or molding a compound or composition consisting largely of putty, which is pressed or laid upon the strip as it passes through the machine, an ornamented surface being given the putty by the configuration of the embossing-wheel.

I have illustrated my invention by the drawings accompanying the same, in which Figure 1 is a cross-section of the machine. Fig. 2 is a side elevation of the same. Fig. 3 is an elevation in the nature of a detail of the parts forming the completed wheel, (when placed together,) by means of which the strip or molding is held up to or against the embossing-wheel. Fig. 4 is a cross-section of a molding embossed by the wheels illustrated in Fig. 1. Fig. 5 is a cross-section of rings forming a wheel which may be substituted for the lower wheel illustrated in Fig. 1. Fig. 6 is a cross-section of a molding embossed with the same embossing-wheel illustrated in Fig. 1, but with the wheel illustrated in Fig. 5 substituted for the lower wheel illustrated in Fig. 1.

Like letters refer to like parts throughout the several views.

X X is the frame-work of the machine.

Y Y are the boxes in which the upper shaft or mandrel rotates.

Z Z are screws attached to boxes or journals Y Y, by means of which the distance between the shafts or mandrels carrying the rolls is regulated. Screws Z Z are turned by wheels W' W' and hand-wheel W.

V is the shaft by which motion is imparted to the machine.

V' is a driving-pulley, and V² an ordinary gear-wheel.

The several parts indicated by the above letters are not new, or at least form no considerable part of my invention.

A A' are mandrels extending throughout the frame-work of the machine.

$a$ $a$ are grooves on one end of mandrels A A'.

$a'$ $a'$ are grooves or keyways extending the whole length of mandrels A A'.

B B' are gear-wheels on mandrels A A'. Gears B B' each extend through the box or journal Y Y, in which they severally rotate, and have collar $e'$ $e$ placed on such extension to retain said gears in place. Any suitable means for retaining these wheels in place when the mandrels A A' are withdrawn therefrom may be employed.

b b' are spring-latches secured to wheels B B' and fitting into grooves a a, and prevent mandrels A A' from sliding out of position. Wheels B B' are provided with a key fitting into keyway a' a', so that the revolution of wheels B B' produces like revolution in mandrels A A'.

C is an embossing-roll.

D is a roll composed of the several ring-sections $d\ d'\ d^2\ d^3\ d^4\ d^5\ d^6\ d^7$, illustrated in Fig. 3, or of other like ring-sections of varying form and diameter.

E are washers or ring-sections used for retaining embossing-roll C in position, and for holding ring-sections forming roll D together and in proper position.

C D E are each provided with a key, as are B B'.

When it is desired to change the embossing-roll C, latch b' is raised from groove a in wheel B', and the mandrel A' withdrawn, when a different embossing-wheel may be substituted and the mandrel replaced in position.

When it is desired to use embossing-wheel C upon a molding having a different cross-section from the molding illustrated in Fig. 4, as, say, to produce a molding having a cross-section similar to that illustrated in Fig. 6, the several ring-sections forming wheel D', illustrated in Fig. 5, may be substituted for the wheel D by withdrawing mandrel A and placing D' upon said mandrel in place of wheel D. A different embossing-wheel, C, may likewise be used in the machine, wheel D remaining unchanged.

In the manner described a large and varying amount and kind of molding may be embossed in my machine by the use of different embossing-wheels and different wheels D built up from suitable ring-sections, a comparatively limited supply of these ring-sections enabling me to obtain a wheel, D or D', which will present the proper and necessary support to the molding, upon the upper surface of which the embossing-wheel C or other like wheels of different form are pressing the embossing composition having the desired ornamental surface. It is evident that the principle upon which the back roller is built up of rings, termed by me "ring-sections," may be, and in fact is, applied to the building up of the embossing-wheel, the dotted lines in Fig. 1 illustrating this, and hence no detailed description of its construction is required.

Having thus described my invention, what I claim is—

1. In a machine for embossing picture-frame molding, an embossing-wheel detachably secured to a mandrel and having an ornamented periphery, the cross-section of which periphery is at varying angles with the axis of said embossing-wheel, in combination with a back roller built up of suitable ring-sections, all detachably secured to a mandrel, all substantially as described, and for the purpose set forth.

2. In a machine for embossing, an embossing-wheel having an ornamented periphery, the cross-section of which periphery is at varying angles with the axis of said embossing-wheel, a mandrel passing through said embossing-wheel and detachably secured thereto, a gear-wheel placed on said mandrel and also detachably secured thereto, in combination with a back roller built up of ring-sections, and a gear, both detachably secured to a mandrel, all substantially as described, and for the purpose set forth.

3. In a machine for embossing, an embossing-wheel having an ornamented periphery, the cross-section of which periphery is at varying angles with the axis of the embossing-wheel, the said embossing-wheel being built up of separate embossing-wheels forming ring-sections, and detachably secured to a mandrel, in combination with a back roller built up of suitable ring-sections detachably secured to a mandrel, all substantially as described, and for the purpose set forth.

4. In a machine for embossing, an embossing-wheel built up of separate embossing-wheels forming ring-sections detachably secured to a mandrel, a gear also detachably secured to the mandrel, in combination with a back roller built up of rings detachably secured to a mandrel, and a gear also detachably secured to the mandrel, all substantially as described, and for the purpose set forth.

JULIUS STANGE.

Witnesses:
CHARLES T. BROWN,
LEONARD L. KLEINE.